April 28, 1959          J. A. LAUCK          2,883,937
CONSTANT PRESSURE VARIABLE DISPLACEMENT PUMP
Filed Jan. 10, 1955          3 Sheets-Sheet 1
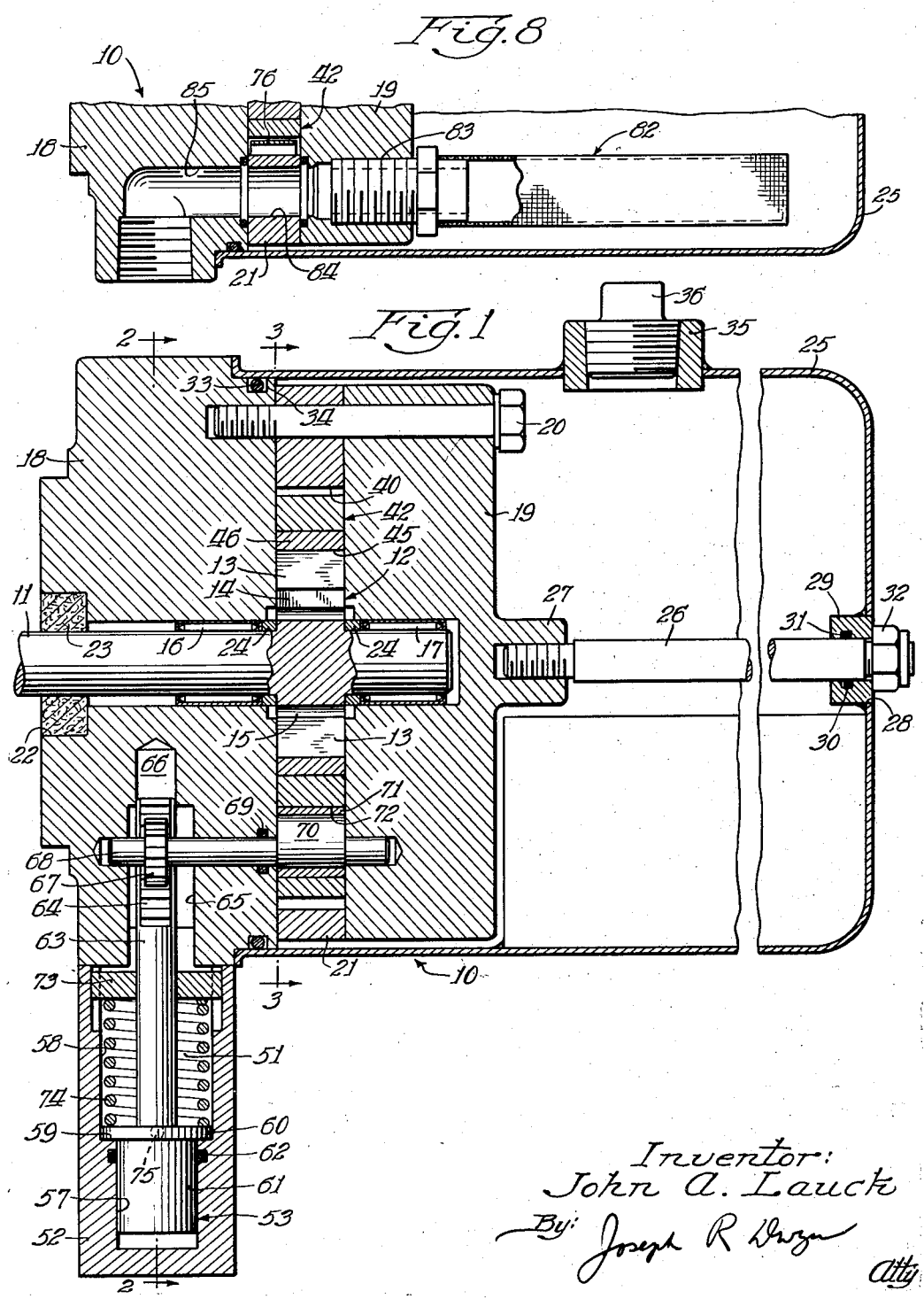
Inventor:
John A. Lauck
By: Joseph R. Dwyer
Atty

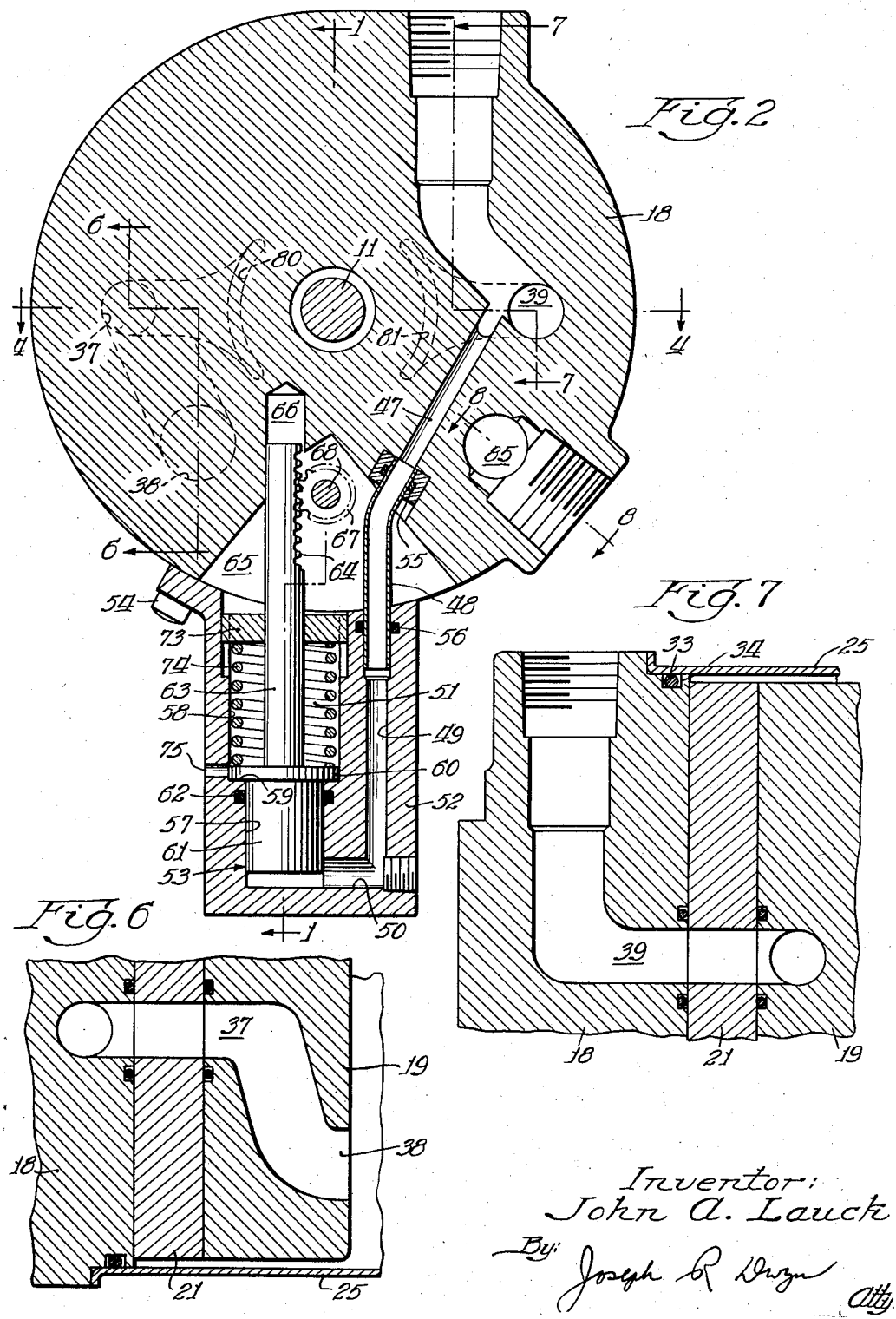

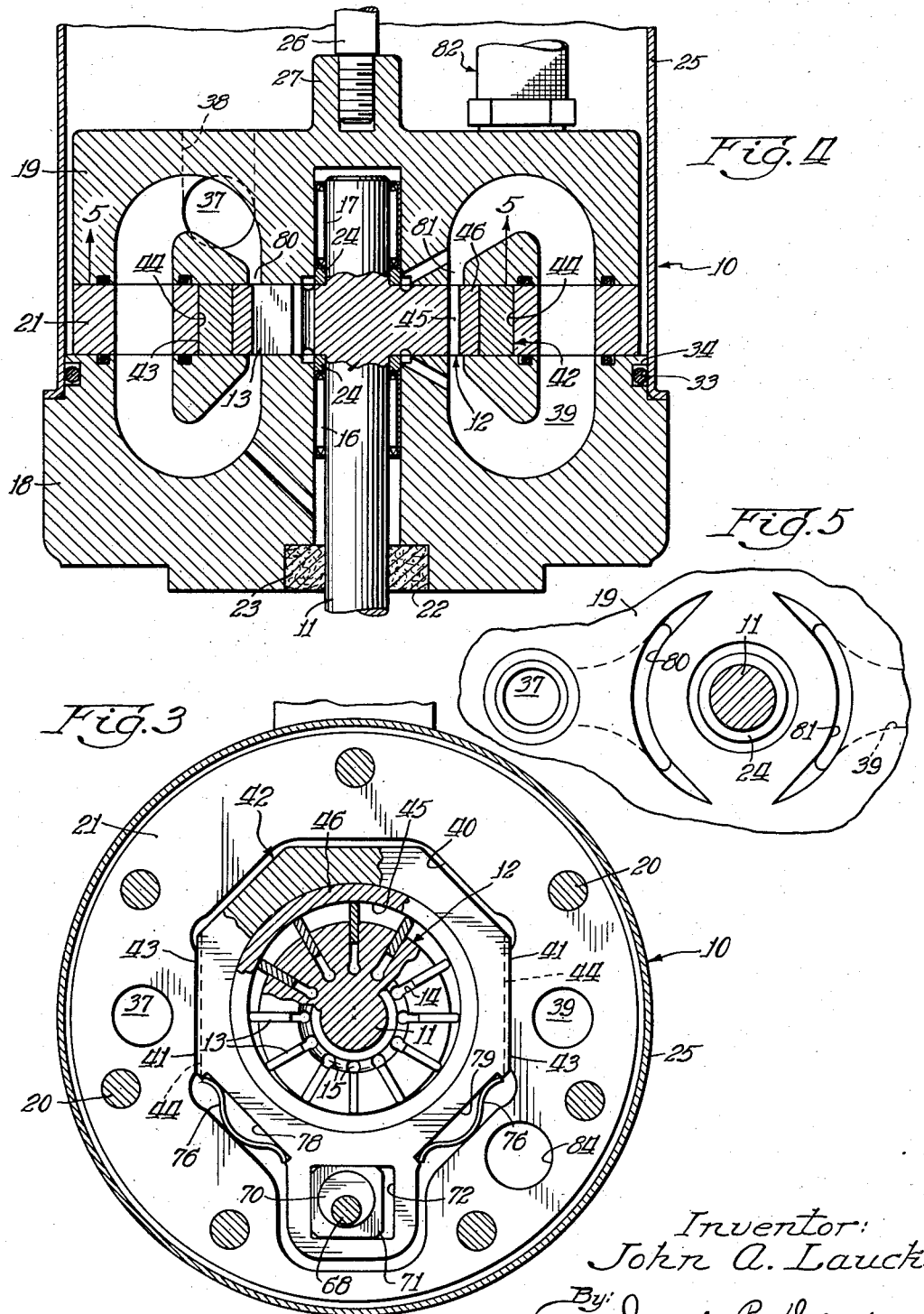

United States Patent Office 2,883,937
Patented Apr. 28, 1959

2,883,937

CONSTANT PRESSURE VARIABLE DISPLACEMENT PUMP

John A. Lauck, Shaker Heights, Ohio, assignor to Borg-Warner Corporation, Chicago, Ill., a corporation of Illinois Application January 10, 1955, Serial No. 480,684

3 Claims. (Cl. 103—120)

This invention relates in general to fluid pumps and more particularly to improved pumps arranged to supply a variable flow of fluid continuously to a system incorporating a number of fluid utilization devices, each of which requires a substantially uniform rate of fluid flow at a predetermined pressure. This invention is adapted for providing hydraulic operation of a plurality of accessory devices in an automotive vehicle, for example, steering boost mechanisms, window wiper operators, window raising and lowering mechanisms, seat positioning mechanisms, fan drive mechanisms, generator drive mechansims and brake operating mechanisms and refrigeration drive mechanism. While specifically adapted to be used in automotive vehicles such as passenger cars, the invention is equally adaptable for use in industrial automotive vehicles such as buses, trucks, tractors, farm machines or earth moving equipment and the like.

It has long been realized that the many problems encountered in the design of pumps for use in connection with accessories has long remained unsolved, and it has been heretofore necessary in certain instances that the prior art pumps have additional motors and/or driving means connected thereto so that the pump could be driven at a constant rotational speed regardless of the speed of the vehicle resulting in a very uneconomical and unsatisfactory solution. In other instances where prior art devices have been directly connected to the automotive engine to be driven in accordance with the rotational speed of the drive shaft of the latter, innumerable difficulties have resulted because the variation in the rotational speed of the drive shaft of the engine caused the pump to fluctuate in its output pressure. To overcome these difficulties, various supplementary devices, such as multiple clutches, governors, by-pass valves and the like, have been added. Obviously, such prior art devices are not economical and are exceedingly difficult to service and maintain.

In this connection, it is well recognized that, in the present-day automotive vehicle, it is desirous to supplement the manual force required to steer the vehicle with additional booster mechanisms making it easier for the driver to handle and control the vehicle. Also, it is desirous to operate the window wiper at a constant speed without booster mechanisms and to raise and lower the windows automatically and centrally without the necessity of employing manual means placed at each of the windows. Further, it is desirous to operate the fan of an automotive vehicle only when the temperature of the engine requires cooling, thus reducing the horsepower required for such fan drive and causing more horsepower to be available for the operation of the vehicle. It is therefore apparent that it is desirous to have a pump for supplying a flow to a system including the accessories and directly connected to the automotive engine to be driven in unison therewith, able to supply fluid to each accessory at a predetermined substantially constant flow, irrespective of the speed of the engine and irrespective of the number of accessories in operation at any particular time, so that the driver may have the hydraulic power assistance required or desired at that particular time. Thus, the invention seeks as its major accomplishment the provision of a pump which can be connected to an automotive engine, so as to be driven in unison therewith, yet deliver a flow of fluid over a volumetric range at a predetermined pressure to each hydraulic accessory incorporated in a hydraulic system regardless of the rotation speed of the engine shaft and in accordance with the demand caused by the number of accessories in operation at any particular time.

Accordingly, this invention has as its preliminary object the provision of improved pumps capable of supplying a variable rate of flow of fluid at a predetermined pressure to each of a number of fluid actuated accessories regardless of the extremely wide and frequent variations of the rotational speeds of the driving means of the pump and in accordance with the demand for a volume of fluid on the pump because of the number of accessories in operation at any particular time, and, also to simplify its construction and its mode of operation as compared to conventional type pumps used for this purpose.

An additional object of this invention is the provision of improved pumps which are especially designed to supply a variable fluid flow to an automotive vehicle system incorporating a number of accessories, each of which requires a substantially fixed flow of fluid at a constant pressure regardless of the rotational speed of the automotive engine drive shaft to which the pump impeller can be connected to rotate in unison therewith and also regardless of the number of accessories in operation at any particular given time.

Still another object of this invention is to provide an improved pump especially adapted for hydraulic systems for providing the operation of a plurality of hydraulic accessories in automotive vehicles which is particularly characterized by its simplified construction and which eliminates all unnecessary supplemental mechanisms such as multiple clutches, governors, by-pass valves, etc. heretofore connected to prior art pumps in order to regulate the flow of the fluid discharged by these prior art pumps.

Still another object of this invention is to provide an improved pump especially adapted for supplying fluid to a system incorporating a plurality of hydraulically operated accessories in automotive vehicles, the construction of which is particularly characterized by embodying within the pump means for regulating its output to provide a substantially fixed flow of fluid required by each of the accessories regardless of the rotational speed of the automotive engine to which it is connected and in accordance with the demand of the number of accessories in operation at any particular time.

Still another object of the invention is to provide a vane type pump which will deliver a volumetric variable rate of flow of fluid to each of a number of accessories in an automotive vehicle requiring such substantially uniform flow.

More particularly, the object of this invention is to provide an improved constant pressure variable displacement pump which is automatically adjustable in response to operating conditions and requirements encountered during the operation thereof.

Still a further object of this invention is to provide constant pressure variable displacement pump structure incorporating improved displacement variable control means.

Even more particularly, the object of this invention is to provide an improved constant pressure variable displacement pump adapted to supply a variable flow of fluid to a hydraulic automotive vehicle system incorporating a number of hydraulically operated accessories which is so constructed that the eccentricity of its fluid impelling means may be varied from zero to maximum automatically responsive to fluid pressure due to the demands of the number of accessories in operation at any particular given time.

Other objects, features and advantages of the present invention will become apparent from the following detailed description when taken together with the accompanying drawings, in which:

Figure 1 is a longitudinal section of a pump embodying the principles of the present invention and taken on line 1—1 of Figure 2;

Figure 2 is a partial cross-sectional view taken on line 2—2 of Figure 1 showing to advantage the pump displacement modifying means;

Figure 3 is an elevational view of the pump impeller of Figure 1 with certain portions thereof shown in section;

Figure 4 is a section-view of Figure 2 as taken along line 4—4 looking in the direction of the arrows;

Figure 5 is a view of the pump inlet and discharge ports taken on line 5—5 of Figure 4 looking in the direction of the arrows;

Figure 6 is a sectional view taken on line 6—6 of Figure 2 looking in the direction of the arrows and showing to advantage the inlet passage to the pump chamber;

Figure 7 is a sectional view taken on line 7—7 of Figure 2 looking in the direction of the arrows and showing to advantage the discharge passage from the pump chamber; and Figure 8 is a sectional view taken on line 8—8 of Figure 2 looking in the direction of the arrows and showing to advantage the fluid filter associated with the pump.

In the various views, the same reference character is employed to refer to the same part.

Referring to the drawings, there is shown a pump unit 10 embodying the principles of the present invention which is of the type wherein a shaft 11 adapted to be driven by a variable speed motor (not shown), such as that of an automotive vehicle, drives a rotor or impeller 12, keyed or otherwise secured fixedly thereto and having a plurality of radially extending reciprocal fluid impelling vanes 13.

The rotor or impeller 12 is of a known type having radial slots 14 for the vanes 13, the inner ends of the slots being formed with circular enlargements 15 for freedom of action.

The shaft 11 is journaled in needle or other appropriate bearings 16 and 17 carried by opposite face plates 18 and 19, respectively, secured as by means of screws 20 to opposite sides of a body block 21. The face plate 18 is formed with a recess 22 in which is carried an oil seal 23, of a known type, which surrounds the shaft 11 and which prevents leakage of fluid from the pump. Appropriate washers, such as 24, surround the shaft to present bearing surfaces for the bearings 16 and 17. A tank 25, the purpose of which will be later described, is removably attached to the face plate and body block assembly by means of a stud 26, threadably received in a boss 27 rearwardly extending from the face plate 19, and which passes through an opening 28 in the tank. Disposed in the opening 28 is an annular member 29, secured to the tank, as by welding, which surrounds the stud 26. The annular member is formed with a groove 30 in which an O-ring seal 31 is received. A nut 32 is received on the stud 26 and bears against the annular member 29 to fix the tank in position. An O-ring seal 33 is received in a groove 34 formed in the face plate 18 and together with the O-ring seal 31, causes the tank 25 to be fluid tight. Also provided is a pipe 35 extending upwardly from the tank 25 at its top and is secured thereto, as by welding, in which a plug 36 is received, the purpose of which will be later described. The face plate and body block assembly is formed with a fluid inlet passage 37 which communicates at 38 with the lower portion of the tank 25 and is also formed with a fluid outlet passage 39, formed to receive a suitable fitting (not shown) to supply fluid under pressure to the system in which the pump is employed.

According to the present invention, means are provided within the pump unit 10 for maintaining nearly as practicable a constant pressure of the hydraulic fluid at the outlet 39, in spite of wide variation in the speed of the shaft, and thereby of the rotor 12, as well as a wide range of fluid demand at the outlet 39 due to the demands of the accessories in operation at a particular time. This is accomplished automatically responsive to internal fluid pressure. To this end, the body block 21 is formed internally with a substantially octagonal shaped chamber 40 of a substantially greater area than required for the pumping sweep of the pump vanes 13 and is formed at opposite sides with bearing pads 41. Within the chamber 40 is reciprocally slidably disposed a substantially octagonal shaped sliding block assembly indicated in its entirety by 42 which is shorter by predetermined length than the chamber 40 and which is formed with bearing surfaces 43 and grooves 44 at its opposite sides. The bearing surfaces 43 are slidably in engaged relation with the bearing pads 41 and resist the tendency of the sliding block assembly 42 to turn due to the torque impressed on the impeller 12, while the grooves 44 provide communication between the top and bottom of the sliding block assembly and prevent a build-up of pressure in the upper portion of the chamber 40 which may tend to urge the sliding block assembly 42 downwardly. A circular pump chamber 45 is formed in the sliding block assembly 42 and is defined by a ring 46. Appropriate bearing material between the block assembly 42 and the ring 46 (not shown) may be pressed in the block or may be formed integrally therewith to provide a bearing surface for the ring 46. The chamber 45 accommodates the pump rotor 12 and the inner periphery of the ring 46 is of a diameter to have the outer edges of the rotor vanes 13 bear uniformly slidably against the wall thereof. The relation of the sliding block assembly 42 is such to the shaft 11 and the chamber 45 in the body block 21 that when the sliding block assembly 42 is slidably shifted fully to one end of the chamber 40, in the present instance to the upper end as viewed in the drawings, full eccentricity of the pump chamber 45 with the rotor 12 is attained. When the sliding block assembly 42 is shifted to the opposite extreme end of the chamber 40, full concentricity of the pumping chamber 46 relative to the rotor 12 is attained. Thus, rectilinear shifting of the sliding block assembly 42 is effective to vary and control the displacement of the pump from maximum to zero.

Means are provided in the pump to be responsive to the fluid pressure developed by the pump for slidably adjusting the sliding block assembly 42 in both of its opposite directions of pump displacement modifying movement. For this purpose, the high pressure side of the pump is placed in communication, by means of a passage 47 formed on the face plate 18, a connecting tube 48, passages 49 and 50 and a cylinder or chamber 51 formed in a housing 52, with one end of a piston 53 slidably disposed in the cylinder 51. The housing 52 is secured to the face plate 18 by means of bolts 54. Suitable O-ring seals 55 and 56 are disposed around the tube 48 and in the face plate 18 and the housing 52, respectively, to prevent the leakage of fluid therefrom. The cylinder 51 is constructed to have a portion 57 which is in communication with the passage 50, of one diameter and another portion 58 of a different and greater diameter, the portions being joined by a perpendicular wall or shoulder 59. The piston 53 is constructed to be complementary to the cylinder, and is substantially T-shaped in cross-section, having an enlarged flange portion 60 and a depending reduced diameter portion 61, the reduced portion 61 being of such a length that when the piston is at its lowermost position (as viewed in the drawings), with the flange portion 60 in contact with the wall or shoulder 59, the piston will not block the communications between the passage 50 and the cylinder 51. A suitable O-ring seal 62 is provided in the cylinder surrounding the piston portion 61 to prevent the leakage of fluid therefrom.

A stem 63 is connected to the piston 53 and extends upwardly therefrom and is formed with a rack 64 thereon. The stem is movable in openings 65 and 66 formed on the face plate 18. The rack 64 meshes with a pinion 67, disposed in the opening 65 and is carried by a shaft 68 suitably journaled on the face plates 18 and 19. A suitable O-ring seal 69 is provided to prevent the escape of high pressure fluid around the shaft 68. The shaft 68 is formed with an eccentric cam portion 70 rotatably mounted in a substantially rectangular slidable cam block 71 received in an elongated substantially rectangular opening 72 formed in the sliding block assembly 42. As is obvious, rotation of the shaft 68 will cause the cam 70 to rotate, thus changing the eccentricity thereof and causing the cam block 71 to slide in the opening 72 with a resulting rectilinear shifting of the sliding block assembly 42.

Fixedly disposed in the large diameter position 58 of the cylinder 51 is a plug member 73 and through which passes the piston stem 63 and a coil spring 74 is received in the cylinder portion 58 between the plug member 73 and the piston flange portion 60 surrounding the piston stem 63 and normally biases the piston in its lowermost position. A bleed opening 75 is provided in the housing 52 so as to bleed off any fluid which may ingress between the wall or shoulder 59 and the piston flange portion 60.

A pair of wave-springs 76, 76 are disposed in the chamber 40 and are received in notches 78 and 79, respectively, formed in the lower walls of the sliding block assembly 42 and bear against the walls of the chamber 40, the purpose of which will be later described.

Low pressure fluid communication between the inlet passage 37 and the pump chamber 45 is effected by way of a semi-circular or generally kidney-shaped port 80 and high pressure communication between the pump chamber 45 and the passage 47 and the outlet passage 39 is effected by way of a semi-circular or generally kidney shaped discharge port 81, the ports 80 and 81 being of such length and disposition as to afford resistance-free pressure communication with the pump chamber 45.

An elongated circular screen-type oil filter assembly 82 is disposed in the tank 25 and is threadably secured in a passage 83 formed in the face plate 19. Communicating with the passage 83 are passages 84 and 85 formed in the body block 21 and the face plate 18, respectively, forming a return for the fluid used in the system in which the pump is employed. Fluid is thus filtered during return to the tank 25, which acts as a fluid reservoir for the hydraulic system. The pump inlet passage 37 in communication with the tank 25 at 38 is always submerged in the fluid in the tank so that fluctuations in the volume of fluid contained in the tank 25 will not affect the operation of the pump at its inlet side. Fluid may be added to the tank 25 through the pipe 35, previously described.

When the pump is not operating, the sliding block assembly 42 is maintained in its upward position as shown in the drawings by means of the coil spring 74 biasing the piston 53 in the cylinder 51 downwardly and by means of the wave springs 76 and 76 biasing the sliding block assembly 42 upwardly in the chamber 40.

When the sliding block assembly 42 is in the upward position, the pump is at maximum displacement and will, of course, deliver maximum volume of fluid in accordance with any rotational speed of the shaft 11. An increase in pressure in the discharge side of the pump will be reflected in the cylinder 51 through passages 47 through 50, respectively. When the pressure in the cylinder 51 reaches a predetermined value determined by the compression value of the coil spring 74 piston 53 will move upwardly. Movement of the rack 64 rotates the pinion 67 and the shaft 68 changing the eccentricity of the cam 70 ultimately causing the sliding block assembly 42 to move downwardly. Obviously, movement of the sliding block assembly 42 changes the displacement of the pump by decreasing the eccentricity relationship between the rotational axis of the impeller 12 and the pumping chamber 45. Obviously, the amount of eccentricity between the axis of the impeller 12 and the pumping chamber 45 will be determined by the position of the piston 53 responsive to pressures in the discharge side of the pump. Obviously, a decrease in pressure in the discharge side of the pump, caused, for example, by an increase in demand of the fluid in the system, by operation of one or more accessories, or by a decrease in the rotational speed of the shaft 11, will cause the piston 53 to move downwardly, ultimately resulting in an increase in displacement of the pump through the cooperation of the other associated elements as above described.

During the operation of the pump, wave springs 76 and 76 serve to overcome any torque reaction from the rotation of the impeller 12 which may tend to urge the block to its minimum displacement position and facilitate the operation of the spring 74 in returning the piston 53 to a lower position upon decrease in pressure in cylinder 51. During initial pumping operation, the wave springs 76 and 76 provide a portion of the initial force necessary to maintain the sliding block assembly 42 in its maximum displacement position. However, it is obvious that the compression value of spring 74 may be selected to perform the function of wave springs 76 and 76 if desired, thus eliminating the latter.

Thus it may be seen that there has been described a variable volume pump which is adapted to be used in hydraulic systems incorporating a number of accessories, which will deliver fluid at a substantially constant pressure, but with a varying volume depending on the demands at a particular time, which is automatically responsive to the pressure developed therein, which is simple, compact and readily adaptable to modern manufacturing methods of mass production.

Where herein the various parts of this invention have been referred to as located in an upward or downward position, it will be understood that this is done solely for the purpose of facilitating description and that such references relate only to the relative positions of the parts as shown in the accompanying drawings.

In addition, while but one embodiment of the invention has been shown and described, it will be understood that many changes and modifications may be made therein without departing from the spirit or scope of the invention and that the invention is designed and comprehended within the appended claims which should be given a scope consistent with the prior art.

I claim:

1. In a constant pressure variable displacement pump, means defining a sliding block chamber, a block slidable therein, said sliding block having a circular pump chamber therein, a rotary impeller on a fixed axis operating in said pump chamber and having impelling means defined by a plurality of movable vanes cooperative with the annular wall defining the pump chamber to vary the pump displacement as the sliding block moves in said sliding block chamber, biasing means disposed between said sliding block and the wall defining said sliding block chamber, said biasing means tending to maintain said sliding block in a position providing maximum pump displacement, low pressure and high pressure ports respectively communicating with low pressure and high pressure sides of the pump chamber, a cylinder communicating with the high pressure side of the pump chamber, a piston disposed in said cylinder with one side of said piston normally exposed to the pressure created by said pump and a spring operating against the opposite side of the piston normally biasing the piston to resist movement of the piston responsive to pump pressure with predetermined force, a cam block received in an opening in said sliding block, rotatable cam means having a fixed axis of rotation and received in said cam block and adapted to vary the position of said sliding block, means interconnected with said piston and said cam means whereby movement of said piston in response to pump pressure causes rotation of said cam means about its axis of rotation and thus causes the position of said sliding block to be varied relative to said impeller to that the impeller delivers a variable volume of fluid at a substantially constant pressure.

2. In a constant pressure variable displacement pump, means defining a sliding block chamber, a block slidable therein, said sliding block having a circular pump chamber therein, a rotary impeller on a fixed axis operating in said pump chamber and having impelling means defined by a plurality of movable vanes cooperative with the annular wall defining the pump chamber to vary the pump displacement as the sliding block moves in said sliding block chamber, biasing means disposed between said sliding block and the wall defining said sliding block chamber, said biasing means tending to maintain said sliding block in a position providing maximum pump displacement, low pressure and high pressure ports respectively communicating with low pressure and high pressure sides of the pump chamber, a cylinder communicating with the high pressure side of the pump chamber, a piston disposed in said cylinder with one side of said piston normally exposed to the pressure created by said pump and a spring operating against the opposite side of the piston normally biasing the piston to resist movement of the piston responsive to pump pressure with predetermined force, a cam block received in an opening in said sliding block, a rotatable shaft having a fixed axis of rotation, means interconnected with said piston and said shaft whereby movement of said piston rotates said shaft about its axis of rotation, cam means fixedly mounted on said shaft and eccentric thereto and received in said cam block and adapted to vary the position of said sliding block whereby movement of said piston in response to pump pressure causes rotation of said cam means and thereby causes the position of said sliding block relative to said impeller to be varied so that the impeller delivers a variable volume of fluid at a substantially constant pressure.

3. In a constant pressure variable displacement pump, means defining a sliding block chamber, a block slidable therein, said sliding block having a circular pump chamber therein, a rotary impeller on a fixed axis operating in said pump chamber and having impelling means defined by a plurality of movable vanes cooperative with the annular wall defining the pump chamber to vary the pump displacement as the sliding block moves in said sliding block chamber, biasing means disposed between said sliding block and the wall defining said sliding block chamber, said biasing means tending to maintain said sliding block in a position providing maximum pump displacement, low pressure and high pressure ports respectively communicating with low pressure and high pressure sides of the pump chamber, a cylinder communicating with the high pressure side of the pump chamber, a piston disposed in said cylinder with one side of said piston normally exposed to the pressure created by said pump and a spring operating against the opposite side of the piston normally biasing the piston to resist movement of the piston responsive to pump pressure with predetermined force, a cam block received in an opening in said sliding block, a rotatable shaft having a fixed axis of rotation, a pinion fixedly mounted on said shaft, a rack interconnected with said piston and meshing with said pinion whereby movement of said piston rotates said shaft about its axis of rotation, and cam means fixedly mounted on said shaft and eccentric thereto and received in said cam block and adapted to vary the position of said sliding block whereby movement of said piston in response to pump pressure causes rotation of said cam means and thereby causes the position of said sliding block to be varied relative to said impeller so that the impeller delivers a variable volume of fluid at a substantially constant pressure.

References Cited in the file of this patent

UNITED STATES PATENTS

| | | |
|---|---|---|
| 1,943,929 | Rayburn | Jan. 16, 1934 |
| 2,016,315 | Calzoni | Oct. 8, 1935 |
| 2,296,876 | Samiran et al. | Sept. 29, 1942 |
| 2,354,076 | Tucker et al. | July 18, 1944 |
| 2,406,482 | Tucker | Aug. 27, 1946 |
| 2,513,446 | Brown | July 4, 1950 |
| 2,549,714 | Shannon | Apr. 17, 1951 |
| 2,600,632 | French | June 17, 1952 |
| 2,612,114 | Ernst | Sept. 30, 1952 |
| 2,622,534 | Johnson | Dec. 23, 1952 |
| 2,685,842 | Hufferd | Aug. 10, 1954 |